(12) United States Patent
Krishnakumar et al.

(10) Patent No.: US 7,760,754 B2
(45) Date of Patent: *Jul. 20, 2010

(54) PRIORITY ACCESS FOR REAL-TIME TRAFFIC IN CONTENTION-BASED NETWORKS

(75) Inventors: Anjur Sundaresan Krishnakumar, Rocky Hill, NJ (US); Joao Luis Sobrinho, Lisbon (PT)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1049 days.

This patent is subject to a terminal disclaimer.

(21) Appl. No.: 11/304,117

(22) Filed: Dec. 15, 2005

(65) Prior Publication Data

US 2006/0120398 A1   Jun. 8, 2006

Related U.S. Application Data

(60) Continuation of application No. 09/991,415, filed on Nov. 16, 2001, now Pat. No. 7,039,063, which is a division of application No. 08/923,301, filed on Sep. 4, 1997, now Pat. No. 6,359,899.

(60) Provisional application No. 60/050,924, filed on May 28, 1997.

(51) Int. Cl.
*H04L 12/407* (2006.01)
*G06F 13/376* (2006.01)
*G06F 15/173* (2006.01)

(52) U.S. Cl. .................. 370/444; 370/447; 370/461; 370/462; 709/243; 710/242

(58) Field of Classification Search ............... 370/389, 370/444, 447, 461, 462; 709/243; 710/242
See application file for complete search history.

(56) References Cited

U.S. PATENT DOCUMENTS 5,133,062 A * 7/1992 Joshi et al. .................... 703/13
5,426,638 A   6/1995 Maruyama et al.

(Continued)

FOREIGN PATENT DOCUMENTS

JP   60-068741   4/1985

OTHER PUBLICATIONS

U.S. Appl. No. 08/792,327, filed Mar. 8, 1996 by Krishnakumar et al., entitled "A Wireless Lan Distributed Access Procedure Providing Priority For Voice Transmissions."

(Continued)

*Primary Examiner*—Alpus H Hsu
(74) *Attorney, Agent, or Firm*—Ryan, Mason & Lewis, LLP

(57) ABSTRACT

A contention-based network which allows real-time traffic to exist as multiple independent linked-list chains or under certain conditions to be assembled into multiple linked-list chains. A time separation is enforced between the various multiple chains, which are limited to a predetermined maximum number of stations that each can have in order to allow non-real-time stations to obtain timely access to the medium. Ones of the multiple chains may also be joined into a single chain. Blackburst contention is used to enable a chain to be reconstituted robustly from non-anticipated interruptions, such as the failure of one of its stations.

10 Claims, 6 Drawing Sheets

U.S. PATENT DOCUMENTS

| | | | |
|---|---|---|---|
| 5,448,257 A * | 9/1995 | Margeson et al. | 345/3.2 |
| 5,574,933 A * | 11/1996 | Horst | 712/28 |
| 5,619,646 A * | 4/1997 | Hoch et al. | 370/476 |
| 5,844,890 A * | 12/1998 | Delp et al. | 370/230 |
| 5,872,769 A * | 2/1999 | Caldara et al. | 370/230 |
| 6,084,877 A * | 7/2000 | Egbert et al. | 370/389 |
| 6,714,553 B1 * | 3/2004 | Poole et al. | 370/412 |

OTHER PUBLICATIONS

I. Chlamtac, "An Ethernet Compatible Protocol for Real-Time Voice/Data Integration," *Computer Networks and ISDN Systems* 10 (1985) 81-96, Elsevier Science Publishers B.V. (North Holland).

* cited by examiner

PRIORITY ACCESS FOR REAL-TIME TRAFFIC IN CONTENTION-BASED NETWORKS

This application is a continuation of U.S. patent application Ser. No. 09/991,415, filed on Nov. 16, 2001 now U.S. Pat. No. 7,039,063, which is a divisional of U.S. patent application Ser. No. 08/923,301, filed on Sep. 4, 1997 now U.S. Pat. No. 6,359,899, which claims the benefit of U.S. Provisional Application Ser. No. 60/050,924, filed May 28, 1997.

BACKGROUND OF THE INVENTION

Contention-based networks, including local area networks such as Ethernet® networks, were originally designed with bursty data transmission in mind. More recently, such networks have been looked toward to support real-time applications such as voice and video. However, using contention-based networks to carry real-time traffic may be problematic because of such networks' inability to guarantee a maximum, or bounded, delay service and thus their inability to guarantee a desired level of service quality for real-time applications.

In order to address this issue, techniques have been proposed which give a certain degree of priority to real-time traffic. One approach is a pre-emptive approach wherein a station desiring to transmit a real-time packet simply comes on to the network's communications medium, e.g., coaxial cable, and transmits a fixed-length preamble. This causes a collision with any then existing traffic. Pursuant to conventional protocol schemes, the station that was transmitting the existing traffic ceases transmitting upon detecting that the collision occurred. At that point the real-time station which caused to collision simply continues with the transmission of its real-time packet. While serving to provide immediate access for the real-time station, this approach has the disadvantage that any packet that was being transmitted at the time of the collision will have to be retransmitted, thereby reducing the overall efficiency of the network. Moreover, the probability of such a collision increases with increasing network load, thereby increasing the number of collisions and further reducing efficiency at higher network loads.

A more efficient approach is that described for example, in I. Chlamtac, "An Ethernet Compatible Protocol for Real-Time Voice/Data Integration," *Computer Networks and ISDN Systems*, 10 (1985), Elsevier Science Publishers B.V. (North-Holland), pp. 81-96, in which the various currently active real-time stations establish an order of transmission among themselves and use, for example, the notion of a succession, or chain, wherein the real-time stations transmit one after the other in a way which does not allow the medium to be perceived by the non-real-time stations as being idle. It is only after all the real-time stations have had an opportunity to transmit packets they then have ready that the medium again becomes idle, and thus available to any station then having data to send. See also, for example, Szabo, "An Ethernet compatible protocol to support real time traffic and multimedia applications," *Computer Networks and ISDN Systems*, Vol. 29, page 335-42, 1997.

Disadvantageously, as more and more real-time stations are added to the chain, the average delay suffered by non-real-time traffic increases due to the reduced time available for such traffic; an increase in the duration of the continuous period over which the non-real-time stations are precluded from getting access to the medium; and an increase in the probability of collisions involving non-real-time stations once the stations of the chain have all finished transmitting. Indeed, given a desired maximum such delay, and especially at high network loads, an upper limit exists on the number of real-time stations that can be allowed to be simultaneously active.

SUMMARY OF THE INVENTION

Networks embodying the principles of the invention support the existence of multiple chains. This approach, we have found, allows the network to, in turn, support a higher level of traffic than when only a single chain is allowed, at least at high network loads, given any particular constraint on the acceptable delays for non-real-time traffic.

Preferred embodiments of the invention include a mechanism for enforcing the time separation between the various chains and also include a mechanism for enforcing a predetermined maximum number of stations that each chain can have, in order to allow non-real-time stations to obtain timely access to the medium. Moreover, preferred embodiments account for the fact that the time separation between any two of the chains, even if initially set at an amount which does provide for timely access for non-real-time stations, is subject to change over time due to such factors as stations becoming active and inactive and, in the case of non-pre-emptive systems, due further to the fact that the initiation of the access to the medium by a particular chain may be delayed by the presence of a non-real-time data transmission. In particular, preferred embodiments include mechanisms providing what we call "list maintenance," this involving such actions as joining, or consolidating, chains when their time separation is less than a specified value (as long as the resulting chain does not exceed the above-mentioned length limit), and otherwise increasing to an acceptable value the separation of chains which are close together and not candidates for being joined. List maintenance also includes such actions as a) maintaining the various chains as near as possible to the aforementioned maximum size and b) recovering robustly from non-anticipated interruptions, as taught in our co-pending U.S. patent application Ser. No. 08/923,302 filed of even date herewith.

DETAILED DESCRIPTION

Figure 1:
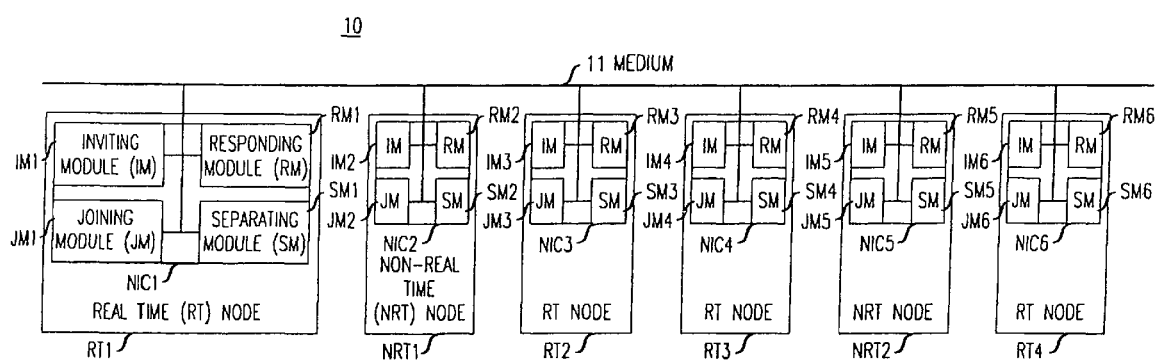
FIG. 1 shows a contention-based network in which the invention is illustratively embodied.

FIG. 1 shows a contention-based network 10—illustratively an Ethernet® local area network—in which the present invention is implemented. Network 10 includes a coaxial cable transmission medium 11 to which are connected six communications stations. Although the relevant principles of Ethernet operation generally, and of the invention specifically, are illustrated herein in the context of a network supporting those six stations, a typical Ethernet or other network in which the invention may be utilized may include many more stations, up to the maximum allowed by the network specification itself. The stations connected to medium 11 comprise non-real-time stations NRT1 and NRT2 which generate non-real-time signals such as file transfer or other data-type signals. These stations follow the rules of the Ethernet protocol strictly. The stations connected to medium 11 also include real-time stations RT1, RT2 RT3 and RT4. These stations likewise can generate non-real-time signals, and when they do they likewise strictly follow the Ethernet protocol rules. However, stations RT1, RT2, RT3 and RT4 are also capable of generating real-time signals, such as voice and video signals, and when they do they follow a modified version of the Ethernet protocol rules, as described below, as a way of ensuring that they get priority access to medium 11 relative to non-real-time stations NRT1 and NRT2.

Figure 2:
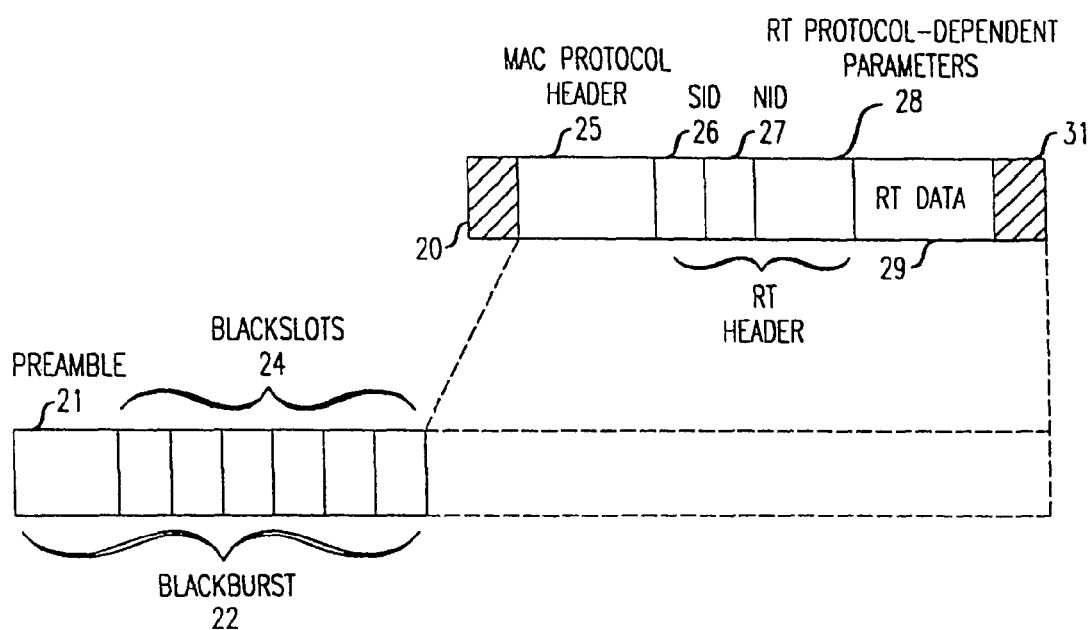
FIG. 2 shows the format of packet frames used by real-time stations of the network of FIG. 1.

FIG. 2 shows the format of the packet frame that is used by the real-time stations when transmitting real-time signals, this format being somewhat different from the standard Ethernet protocol format. The frame of FIG. 2 begins with an optional energy burst 20, followed by Medium Access Control, or MAC header 25; sending station identification, or SID, 26; next station identification, or NID, 27; some real-time protocol-dependent parameters 28; and real-time data 29. The latter comprises the real-time information actually sought to be communicated over the network. This is followed by another optional energy burst, 31. If while transmitting its frame, a real-time station detects a collision, it does not proceed with the transmission of the frame as just described. Rather, it begins the transmission of a blackburst signal 22, comprising a preamble 21 and a number of black slots 24. (The nature of blackburst 22 may be any desired signal as along as it does not contain the Ethernet-defined header preamble.) Assuming that the station achieves access to the communication medium at that time (as described in detail hereinbelow) it then retransmits the packet frame as described above, beginning with the MAC protocol header. (It otherwise ceases transmission for the time being.) The functionalities achieved by the presence of the various fields of this frame are discussed at appropriate points in the sequel.

Figure 3:
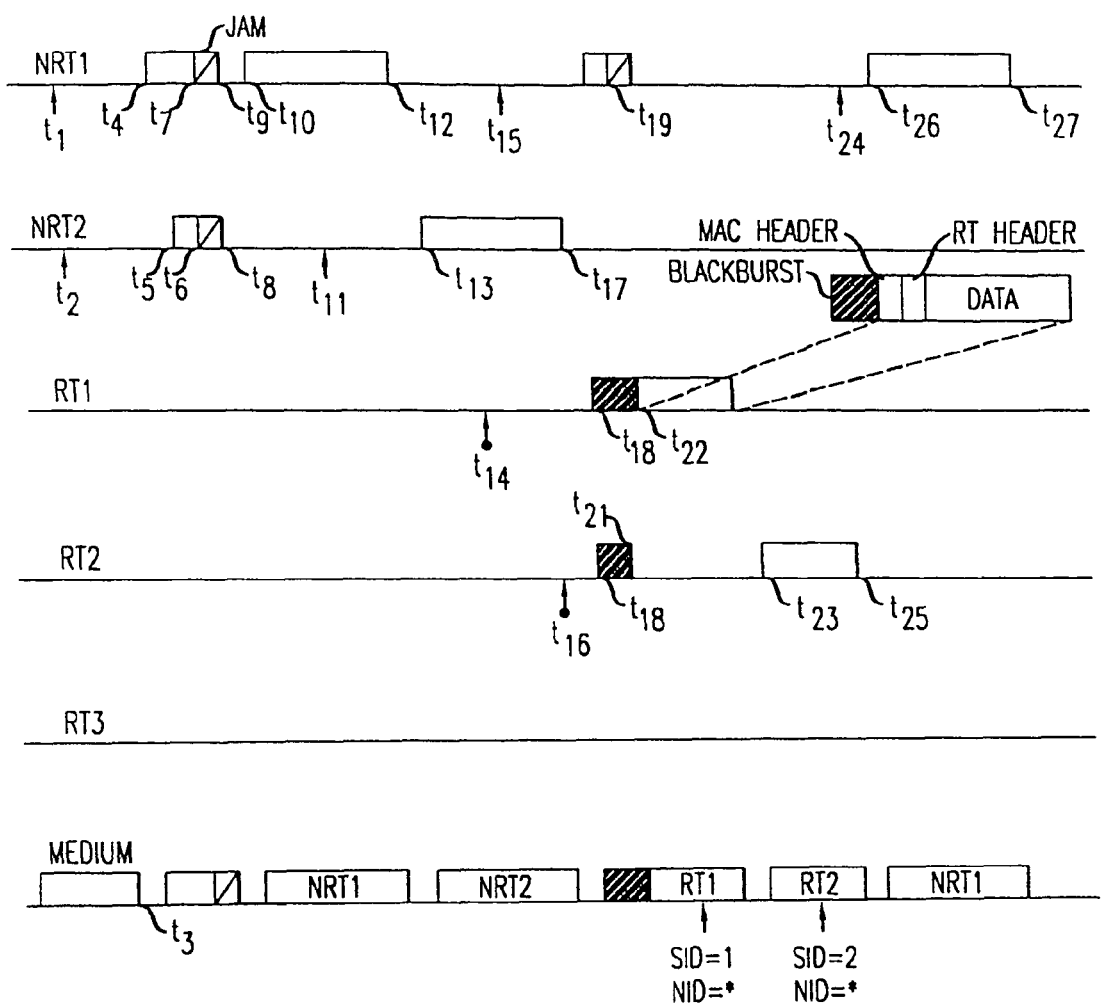
FIGS. 3 and 4 show, when arranged with FIG. 3 to the left of FIG. 4, an illustrative set of signals applied to the communications medium of the network of FIG. 1.
Figure 4:
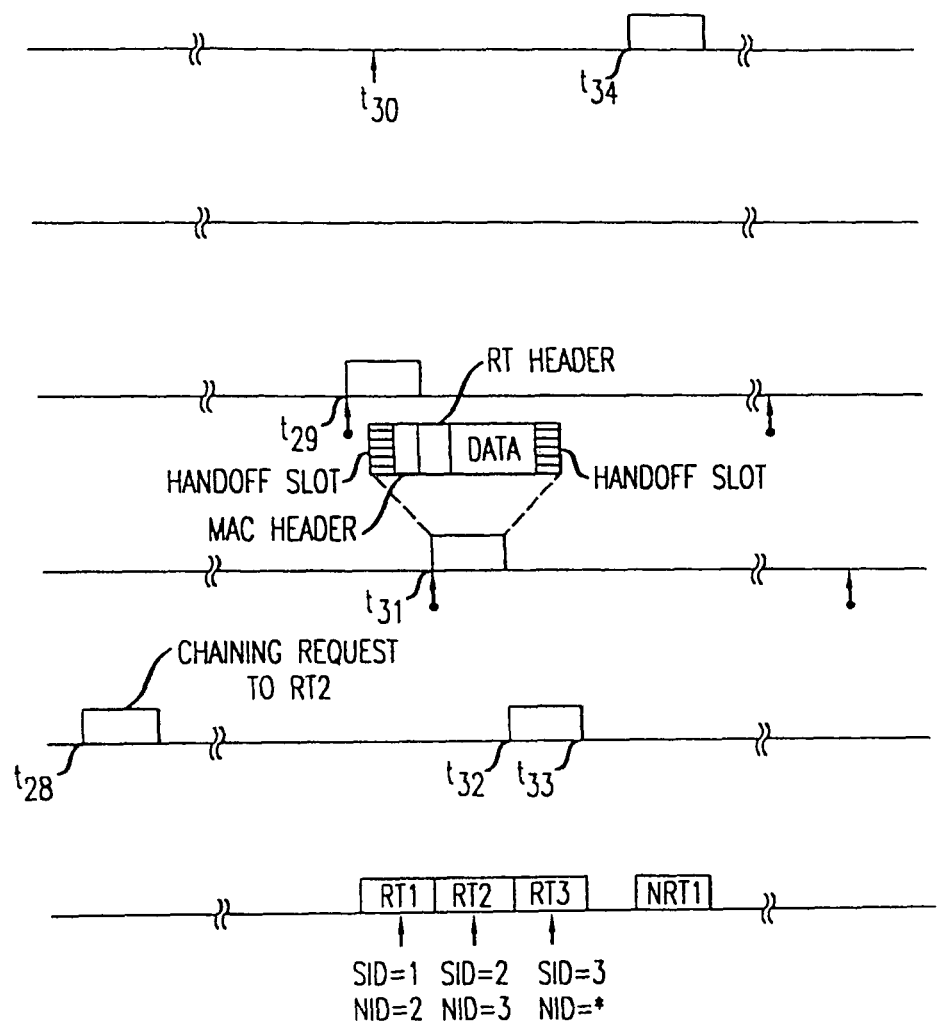

Attention is now directed to FIGS. 3 and 4 which when arranged with FIG. 3 to the left of FIG. 4 show an illustrative set of signals applied to medium 11 by the various stations. FIGS. 3 and 4 also show the overall composite signal appearing on medium 11.

It is assumed that non-real-time stations NRT1 and NRT2 become ready to transmit packets at times $t_1$ and $t_2$, respectively. However, as can be seen from the composite signal on medium 11, some other station is currently transmitting and hence non-real-time stations NRT1 and NRT2 simply wait. The existing transmission terminates at time $t_3$ and it is presumed that non-real-time station NRT1, because of its physical location on the transmission medium, is the first to observe that the medium has become idle. Following conventional Ethernet protocol, non-real-time station NRT1 waits a prescribed interframe time interval $t_{ifs}$ seconds. Having waited $t_{ifs}$ after detecting the end of the prior transmission, non-real-time station NRT1 begins transmitting a conventional Ethernet packet at time $t_4$. It is assumed that non-real-time station NRT2 detects the end of the prior transmission sometime after non-real-time station NRT1 does and, after waiting $t_{ifs}$ seconds, non-real-time station NRT2 begins transmission at time $t_5$. (Unless stated to the contrary, it will hereinafter be assumed that a station waits for $t_{ifs}$ seconds after perceiving the medium to be idle before it begins transmitting—even if that fact is not stated explicitly.) However, both stations subsequently observe at times $t_7$ and $t_6$, respectively, that their transmissions are colliding. Upon observing the collision, each station transmits a conventional Ethernet jam signal of fixed duration, the jam signal being of such a nature that any one or more stations can be transmitting it and yet each will recognize the jam signal as being such. Thus all stations are alerted to the fact that a collision has occurred.

The jam signals transmitted by non-real-time states NRT1 and NRT2, which are of the same duration, terminate at times $t_9$ and $t_8$, respectively, at which point each of them enters a so-called backoff mode in which each station waits for a randomly chosen time interval pursuant to conventional Ethernet protocol, the randomness making it likely that these two stations will not collide again upon their respective subsequent attempts to access the medium. NRT1 exits the backoff mode at time $t_{10}$ and, finding the medium idle, transmits its packet. It completes its packet transmission at time $t_{12}$.

In the meantime, station NRT2 exits the backoff mode at time $t_{11}$, and becomes ready to transmit. Observing that the medium is busy, it waits until the medium becomes idle and ultimately, at time $t_{13}$, gains access to the medium and completes its packet transmission at time $t_{17}$.

While non-real-time station NRT2 was transmitting, real-time station RT1, non-real-time station NRT1 and real-time station RT2 all became ready to transmit, at times $t_{14}$, $t_{15}$ and $t_{16}$, respectively. It may be noted that even though it is desired to give some measure of priority to real-time transmissions, local area network 10 does not implement a pre-emptive approach. Thus ongoing transmissions are not interrupted. Rather both real-time and non-real-time stations always wait until the medium becomes idle. Time $t_{17}$ is indicated as being the point in time that all three stations perceive the medium to have become idle. (In order to simplify the discussion, the actual differences, due to propagation delay, in the times at which stations perceive the medium to be idle will hereinafter be ignored.) All three of those stations begin transmission at time $t_{18}$ which is t ifs seconds after time $t_{17}$. Upon observing, sometime after time $t_{18}$, that a collision occurred, non-real-time station NRT1 transmits a jam signal and enters the backoff mode at time $t_{19}$. However, real-time stations RT1 and RT2, having also detected the collision, proceed to transmit blackburst signal 22. The contents of the blackburst signal can be any desired signal as long as it does not match to any predefined signal defined by the Ethernet protocol. The duration of the blackburst signal that a real-time station is prepared to generate is a function of the level of access priority that it is desired for that station to then have vis-a-vis other real-time stations. Specifically, in preferred embodiments, the duration of the blackburst signal is directly proportional to the length of time each station has been waiting since it became ready to transmit—in the case of real-time stations RT1 and RT2 that being since times $t_{14}$ and $t_{16}$, respectively. Each station transmitting the blackburst signal monitors the medium, and upon perceiving that it is the only station transmitting, stops its blackburst transmission and continues with MAC protocol header 25 and the rest of the FIG. 2 frame. Thus a station may actually transmit fewer black slots than it was prepared to transmit at the time that it initiated its blackburst transmission.

The blackburst signal, more particularly, illustratively consists of a) a preamble, having a duration as described below, and b) an integral number of so-called "black" slots each of duration $\geq 2\tau$, which is the round-trip propagation delay on medium 11. The number of black slots that a station should be arranged to be prepared to send is $d/t_{inter}$, rounded up to the next higher integer value, where d is the time that the station has been waiting and $t_{inter}$ is at least a time given by the length of the packet as shown in FIG. 2 (measuring from the start of the MAC protocol header 25 to the end of the real-time data field 29).

Since real-time station RT1 was waiting longer, its blackburst interval is longer than that of RT2. Hence a point in time will be reached at which only RT1 is transmitting a blackburst signal. In particular, real-time station RT1's blackburst transmission ended at time $t_{21}$, while real-time station RT2's blackburst transmission continued beyond that point. Upon observing, at time $t_{22}$ that it alone was transmitting a blackburst signal, real-time station RT1 stops its blackburst transmission and continues with the rest of its frame.

Meanwhile real-time station RT2, upon perceiving that real-time station RT1's blackburst transmission was longer than its own ceases transmission and enters a waiting mode.

The overall effect of having the real-time stations transmit a fixed length preamble 21 as part of the blackburst signal is to ensure that all non-real-time stations would have ceased transmission and gone into a backoff mode. To this end, the duration of preamble 21 is equal to the sum of a) the aforementioned round-trip propagation delay on the medium, $2\tau$, and b) the duration of the conventional Ethernet jam signal. Priority will thus have been secured for real-time transmissions without suffering the disruptive effects of a pre-emptive approach. Moreover, as among the real-time stations, the use of the blackburst mechanism ensures that when (as in this embodiment) the duration of the blackburst signal is proportional to the length of time each station has been waiting since it became ready to transmit, the real-time station that was the first to become ready to transmit will be the first to obtain access to the medium. Further description of the use of blackburst signals is found in our co-pending U.S. patent application Ser. No. 08/792,327 filed Mar. 8, 1996 and entitled: "A Wireless Lan Distributed Access Procedure Providing Priority For Voice Transmissions."

After real-time station RT1 has completed its transmission, real-time station RT2 gains access to the medium without further delay or collisions inasmuch as no other station is ready to transmit. At time $t_{23}$ real-time station RT2 starts the transmission of its frame, which continues to completion at time $t_{25}$. Meantime, at time $t_{24}$ non-real-time station NRT1 exits the backoff mode and becomes ready to transmit. By then real-time station RT2 is transmitting its frame and non-real-time station NRT1 waits until real-time station RT2 is finished and then begins its transmission at time $t_{26}$, completing at time $t_{27}$.

The nature of real-time traffic is that packets transmitted from a sending station to a receiving station, once initiated, will continue over an extended period of time at regular intervals, this being referred to as a "connection." Therefore each one of real-time stations RT1 and RT2 will be transmitting a significant number of packets from this point forward. The mechanisms described to this point will continue to provide them with priority over non-real-time traffic and also provide round-robin access as among the real-time stations. However, if nothing more were to be done, a significant amount of network resources may become consumed in blackburst contention as among the real-time stations—at least at high traffic loads. Advantageously, the packets transmitted by the real-time stations can be chained with one another in such a way that much of that contention is eliminated. In addition, the chaining can be done in such a way that until all packets in the chain have been transmitted, no non-real-time station can obtain access, thereby precluding any collisions with the same and thereby cutting down on the overhead needed for ensuring that priority for the real-time stations to get priority.

The chaining begins when real-time station RT1 observes that after its own transmission ended, real-time station RT2—identified as a real-time station through information in the RT protocol-dependent parameters 28—transmitted its first packet. During its subsequent transmission, which begins at time $t_{29}$, real-time station RT1 "invites" real-time station RT2 to chain with RT1 for subsequent transmissions. Real time station RT1 does so in its next transmitted frame by setting NID field 27—which was a null character "*"—to the SID 26 found in the frame that real-time station RT2 had transmitted, which is illustratively "2". Real-time station RT2, upon observing this invitation takes access at time $t_{31}$, immediately after RT1 completes its packet transmission, without waiting $t_{ifs}$ seconds, and thereby precludes any non-real-time station from intervening. Real-time station RT1 transmits energy burst 31 at the end of its packet and a similar signal, energy burst 20, is transmitted by real-time station RT2 at the beginning of its packet. The duration of these signals—illustratively the aforementioned $2\tau$—is chosen such that there can be no idle period on the medium between the two packets, so that non-real-time stations are precluded from attempting to access the medium, the energy bursts serving as a sort of "handoff" signal between the two stations. It will thus be appreciated that energy burst 20 (31) is absent when a station is at the head (tail) of a chain (as described below) or is not part of any chain.

It is assumed that at some point in the past real-time station RT3 became ready to start a connection. However, a real-time station, before it attempts access, will observe the channel for a long enough period to determine whether the possibility exists for it to add itself to an existing chain. In the present example, real-time station RT3, after observing the transmission of real-time station RT2 between times $t_{23}$ and $t_{25}$—and after observing the termination of the transmission of non-real-time NRT1 at time $t_{27}$—sends a conventional Ethernet packet to real-time station RT2, beginning at time $t_{28}$, requesting that it be invited to be chained to real-time station RT2 beginning with the latter's subsequent transmission. Real-time station RT2 complies by setting its NID field 27 to the ID that had been specified by real-time station RT3 in its request—illustratively "3". Real-time station RT3, upon observing this invitation takes access at time $t_{32}$, immediately after real-time station RT2 completes its packet transmission, in the same manner that real-time station RT2 had responded to its invitation from real-time station RT1 earlier.

Because each station of a chain "invites" the next one by specifying the latter's ID, the chain is referred to as a "linked-list" or "linked-list chain."

Non-real-time station NRT1 became ready to transmit a packet at time $t_{30}$ but cannot gain access until time $t_{34}$, which is $t_{ifs}$ seconds after the network becomes idle upon termination of real-time station RT3's transmission at time $t_{33}$. It is thus seen that each of the presently active real-time stations, by virtue of the linked-list chaining mechanism, obtained priority over non-real-time station NRT1 even though the latter had become ready to transmit all the way back when real-time station RT1 was transmitting.

Figure 5:
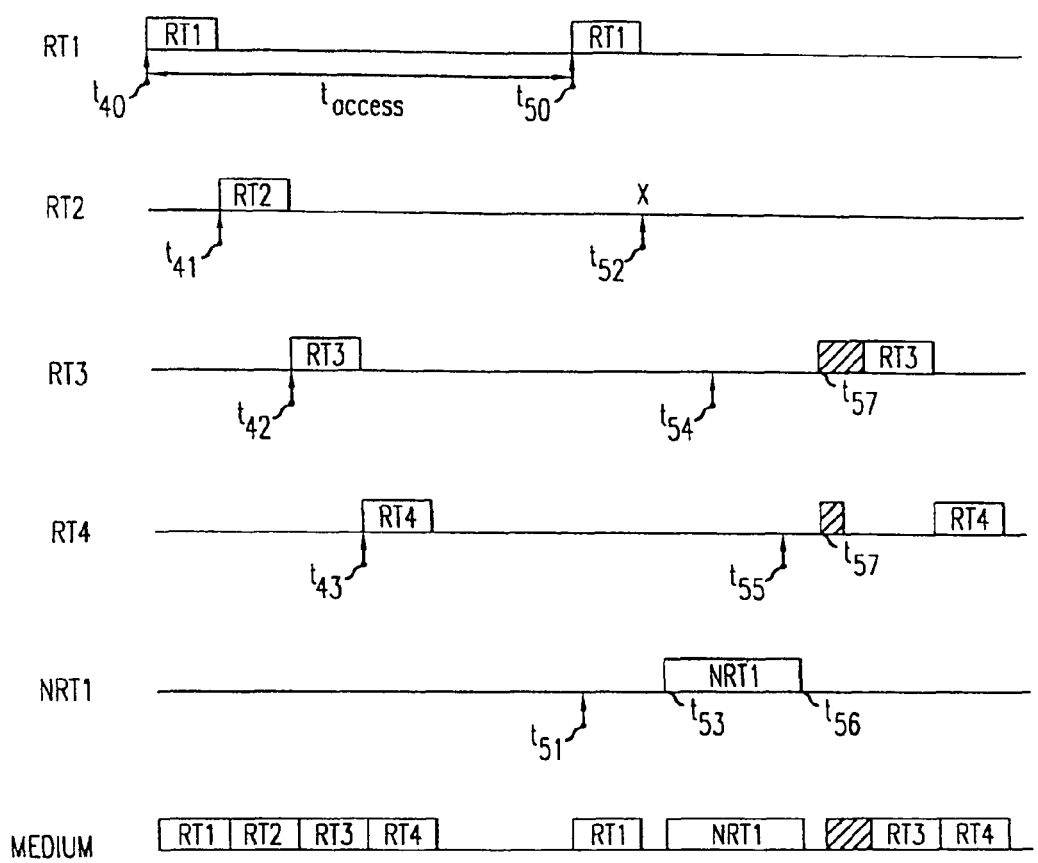
FIG. 5 illustrates an aspect of so-called list maintenance for chains of stations supported within the network of FIG. 1.

FIG. 5 illustrates an aspect of so-called "list maintenance." As previously noted, the nature of real-time traffic is that the real-time stations will repetitively access the medium over an extended period of time in a succession of cycles, or access periods, at regular intervals. In order to ensure robust operation, each of the real-time stations, in each access period, sets a timer, when the station accesses the medium, the timer being set to expire in a subsequent—illustratively the next—access period. The time at which the timer expires defines an expected time at which the real-time station in question should access the medium It may be observed at this point that different real-time stations have their timers set to expire at instants of time that differ by at least $t_{inter}$, i.e., the length of the real-time packets. Therefore, if two or more real-time stations are delayed, their delays will differ by at least $t_{inter}$. As a consequence, the duration of the blackburst signal that each station is prepared to send is guaranteed to differ by at least one black slot, thereby resulting in a unique blackburst contention "winner."

In particular, it is assumed in FIG. 5 that four real-time stations RT1 through RT4 are all active, i.e., have an ongoing connection with another station. Having transmitted packets at times $t_{40}$, $t_{41}$, $t_{42}$ and $t_{43}$, they set their respective timers to expire at times $t_{50}$, $t_{52}$, $t_{54}$ and $t_{55}$. The timer interval $t_{access}$ is illustratively equal to a conventional packetization interval for voice transmissions, which is 25 ms. It is assumed that real-time stations RT1 through RT4 have previously arranged themselves into a linked-list chain in the manner described above and that their transmissions have proceeded normally for some period of time. Moreover, once one of those stations, such as real-time station RT2, becomes ready to drop its connection, it provides an indication of this fact in the last packet of that connection. Upon observing this, station RT1 will begin to invite station RT3, rather than station RT2, thereby re-constituting the chain with one less station.

However, it is possible for a station to discontinue its transmissions without giving any notice, e.g., due to a malfunction of some kind. Thus assume that real-time station RT2 failed to respond to the invitation of real-time station RT1 and thus does not transmit at time $t_{52}$, as expected. Accordingly remedial action needs to be taken. Station RT2 is in the middle of the linked-list chain, and the station which follows it, real-time station RT3, will not transmit until it "sees" a transmission from station RT2. Thus if nothing more were done, neither station RT3 nor station RT4——referred to herein as the "detached stations"—are able to transmit since they are waiting to observe that their predecessor in the chain has transmitted. Since real-time station RT3 did not receive an invitation at the appropriate time, its timer expires at time $t_{54}$. This serves as indication to real-time station RT3 that something untoward has occurred.

The above-described blackburst mechanism provides for a recovery procedure which has as its ultimate result the re-chaining of the detached stations in their original order without, in the process, engendering unconstrained contention among those detached stations. In this example, in particular, non-real-time station NRT1 became ready to transmit at time $t_{51}$ and took access to the network at time $t_{53}$ when it became idle shortly after the end of real-time station RT1's transmission. Real-time station RT3 thus has to wait until non-real-time station RT1's transmission ends at time $t_{56}$. Meanwhile, the timer of real-time station RT4 also has expired, at time $t_{55}$. Thus when the network becomes idle at time $t_{57}$ both real-time stations RT3 and RT4 attempt to access the network. The same sequence of events as occurred vis-a-vis real-time stations RT1 and RT2 beginning at time t 18 comes into play, with the duration of the blackburst signal being directly proportional to the length of the time interval between the expected access time—i.e., the time that the timer expired—and the initiation of the blackburst signal. (As noted earlier, a station, having initiated the transmission of a blackburst signal of particular duration, may terminate the blackburst signal before that full duration has occurred, this being done upon a determination that that station's blackburst signal has become the only blackburst signal being transmitted on the medium.)

Specifically looking again at the FIG. 2 frame, the initial portion thereof includes a first signal, preamble 21, which is of a sufficient duration to ensure that any of the non-real-time stations then transmitting enter the backoff mode, and further includes a second signal, black slots 24, having a duration which is a function of the expected access time (timer expiry) for the station in question. Since the timer of real-time station RT3 expired first, its blackburst signal will be the longer of the two and hence real-time station RT3 will be the first to gain uncontended access. Real-time station RT3 thereupon invites real-time station RT4, as before, causing real-time stations RT3 and RT4 to reconstitute their prior chaining relationship. The network thus robustly recovers from the non-anticipated interruption of the chain caused by the failure of station RT2.

Other scenarios can also result in the timers of more than one station to expire—even in the absence of any failure per se. For example, it may happen that all of the real-time stations of the linked-list chain comprising stations RT1 through RT4 are operating normally, but a long transmission by a non-real-time station delays head station RT1's access to the medium. Indeed, the delay may be of such duration that the timers of any one or all of the remaining stations of the chain also expire. Here, too, however, the above-described mechanisms ensure that once the medium becomes idle, the head station of the chain will be the one to gain access and that the other stations of the chain will thereafter gain access in their proper order.

In general, it may be observed that as a result of the above-described mechanisms, the head station of a linked-list chain serves as a "proxy" for all the other stations of that chain in terms of securing access to the medium for all of those stations. That is, once the head station has obtained access, no further contention for access to the medium occurs.

The above-cited Chlamtac paper does not explicitly address the issue of untoward chain interruption. However, given its underlying approach of having all the real-time stations join in a single chain, such prior art arrangements would undoubtedly include a mechanism for rejoining detached stations to the original linked list chain. This is shown via-a-vis real-time stations RT3 and RT4 in FIG. 5. In particular, real-time station RT1 has observed that a) the real-time station identified in its own NID field 27—namely real-time station RT2—did not come on to the medium but, rather, b) real-time station RT3 was the next real-time station to do so. Accordingly, real-time station RT1 changes the ID in its NID field 27 to identify real-time station RT3. The latter thereupon responds to this invitation in that cycle, and subsequent cycles, and the linked-list chain is thereby reconstituted as a three-station chain.

In accordance with the principles of the present invention, and contrary to the Chlamtac arrangement, the network shown and described herein does not always join multiple linked-list chains that may exist at any particular point in time into a single linked-list chain. Rather, the present network allows for the possibility of two or more chains existing independently for an indefinite period of time. Following that approach in the example just considered, two chains will have been formed—one comprising the single real-time station RT1 and the other comprising the two real-time stations RT3 and RT4. Subsequent events may cause other stations to chain themselves onto the two existing chains, as previously described. Alternatively the two chains may join themselves back into a single chain, as described hereinbelow but, again, do not always do so.

Figure 6:
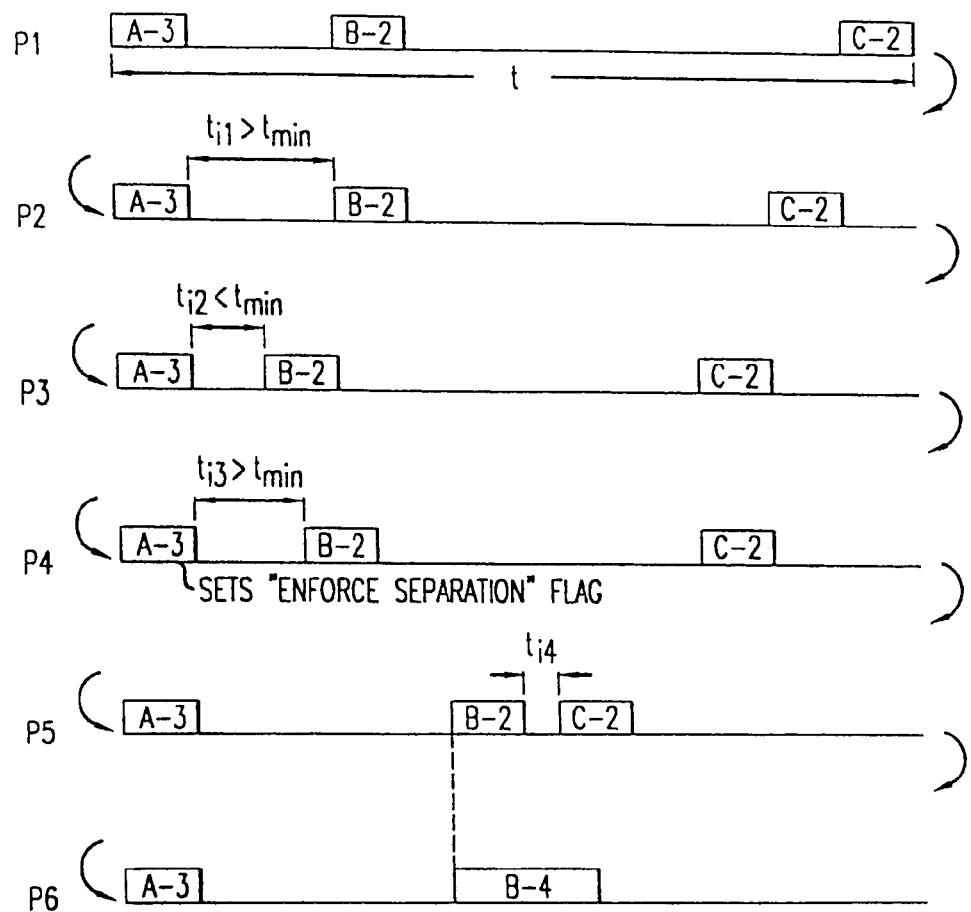
FIG. 6 shows the signals appearing on the communications medium over a number of so-called access periods.

In particular, FIG. 6 shows the signals appearing on the medium over a number of access periods P1 through P6, all of duration $t_{access}$, which occur in the order named but may be separated by other intervening access periods not shown. Each of the transmitted entities is an independent chain marked with a letter and a number, the letter identifying the chain and the number indicating its current length, i.e., the number of stations comprising the chain. Thus, for example, the notation A-3 means that chain A currently comprises three real-time stations. In a first access period, P1, the chains on the network are chains A-3, B-2 and C-2. Each of these chains is separated by some amount of time, the term "separation" being used in the present context to mean the time interval between the end of one chain and the beginning of the subsequent chain. Moreover, it is assumed that those separations remain unchanged in period P2. The separation between chains A-3 and B-2 at this time is denoted $t_{i1}$.

In the present illustrative embodiment, as long as the separation between two chains is greater than a first minimum value $t_{min}$, those chains will be maintained as independent, unjoined, chains. In accordance with a feature of the invention, the time separation between the various chains is preferably kept at least the minimum value $t_{min}$ in order, for example, to allow non-real-time stations to obtain timely access to the network by providing a window during which they may access the medium without interference from real-time stations. The separation between chains will change over time as stations are added to and dropped from the various chains. Moreover, even in the absence of such events, the separations may change due, for example, to the transmissions of non-real-time stations which may cause the onset of a chain's transmission to become delayed. Thus as shown in the FIG., the separation between chains A-3 and B-2 has become smaller in time period P3, at a value $t_{i2}$. It is assumed at this point that $t_{i2}$ has become less than $t_{min}$. This fact is observed by the tail station of chain A-3, which also observes that the total length of chains A-3 and B-2 is five. This exceeds a prescribed maximum length for a chain—assumed in this example to be 4—the enforcing of such a maximum length being desirable, in accordance with a feature of the invention, in order to allow non-real-time stations to obtain timely access to the network. The two chains thus cannot be joined together. Rather, in the subsequent time period P4 the tail station of chain A-3 sets an "enforce separation" indication—which is one of the RT protocol-dependent parameters 28. The head station of chain B-2, upon observing this indication, ensures that its next access to the medium is at least $t_{min}$ seconds after the end of chain A-3. The separation between the chains in time period P4 has now become $t_{i3} \geq t_{min}$.

After some number of periods have elapsed, the situation is assumed to be as shown in time period P5. By this point, the time initiations of chain B-2 have drifted in such a way that the separation $t_{i4}$ between chains B-2 and C-2 has become less than $t_{min}$. Now, however, the total length of the two chains does not exceed 4 and thus they can be joined. Indeed, in accordance with a feature of the invention, it is desirable that they be joined so as minimize the amount of time that may be taken up by blackburst contentions in the event that the respective onsets of the two chains are delayed such as in the scenario described hereinbelow. In particular, the tail station of chain B-2, upon observing this condition, invites, in period P6, the head station of chain C-2 to join it, using the inviting mechanism described above. The latter thereupon joins the former as previously described, giving rise to a single chain B-4.

A tail station, before issuing a request to join the head station of the following linked-list chain, should assure itself that that head station is not the head of its own chain. This is illustratively accomplished by having the tail station check to see that it has observed since the last cycle at least one of the above-mentioned null characters, *, this being a special character used as NID 27 by the tail station of each chain, the existence of the null character indicating the presence of at least one other linked-list chain.

Unless positive steps are taken to prevent it, it is possible for two tail stations to each attempt, within the same cycle, to join its own linked-list chain to that which follows, thereby potentially creating a chain which exceeds the maximum permissible length. In order to prevent this, the count of the number of stations in the list to which a request-issuing tail station belongs should be made just before the request is issued. The tail station keeps a running count of stations in the list that appear on the medium. That station updates the length of its own chain when it gets invited to transmit while it is monitoring an ongoing list (i.e., it is monitoring its own list). If any previous linked-list chain had invited the current linked-list chain to join it, and the joining had occurred, the result would be reflected in the length count. Thus a decision to issue a join request is made based on the current state of the various chains and thus cannot result in a chain whose length exceeds the permissible maximum.

The mechanism described herein using blackburst signals to allow the stations in a linked-list chain to reconstitute themselves in their original order is operative even if more than one chain is involved. Consider an extreme case wherein the medium was busy with non-real-time traffic for such a period of time that none of the stations in either of chains A and B was able to gain access to the medium before their respective timers time out. Once the medium becomes idle and the various real-time stations with expired timers attempt to gain access, the head station of chain A will be the one to gain access since, as among all the stations of chains A and B, it will have been waiting the longest since its timer expired. The chain A head station then invites the other stations of its chain in the manner described above, and since the medium will not be seen by any station to be idle, none of the stations of chain B will attempt to access the medium until the tail station of chain A has completed its transmission. Thereafter the stations of chain B will each attempt to access the medium. Its head station will be the one the gain access since, as among all the stations of chain B, it will have been waiting the longest since its timer expired. The stations of chain B thereupon reconstitute themselves as well.

The maximum number of real-time stations that can be supported while ensuring that the system is unconditionally stable is at least as great as $$\frac{(1+\alpha)m}{\gamma},$$

where $\alpha = t_{bslot}/t_{inter}$, $YY = \alpha + \alpha mr_s/r_c + mr_s/r_c$, $r_s$ is the (constant) bit rate of the sources of real-time traffic, $r_c$ is the network channel bit rate, i.e., the bit rate on medium 11, and m is the number of stations per chain—assuming for purposes of this analysis that each chain comprises the same number of stations. For example, for $r_s=64$ kbps, $t_{access}=25$ ms, and a maximum cable length of 600 m, corresponding to a network spanning 3 hubs, we can support at least 70 stations whereas an ideal scheduling scheme would yield about 130 stations. One way to improve the performance of the system is to cause the head stations of the various chains to enforce a separation among themselves beyond the prescribed value of $t_{inter}$.

The present disclosure has proceeded on the basis that all of the processing involved in controlling access to medium 11 is carried out by circuitry within the stations themselves, e.g., by a so-called network interface card, NIC1, NIC2, NIC3, NIC4, NIC5, and NIC6, installed in a personal computer or workstation. The network interface cards NIC1, NIC2, NIC3, NIC4, NIC5, and NIC6 can include, for example, inviting module IM1, IM2, IM3, IM4, IM5, and IM6, respectively, responding module RM1, RM2, RM3, RM4, RM5, and RM6, respectively, joining module JM1, JM2, JM3, JM4, JM5, and JM6, respectively, and separating module SM1, SM2, SM3, SM4, SM5, and SM6, respectively. However, it may be desirable to provide a separate outboard device, interfaced between the medium and a conventional type of network interface card so that changes to the node itself are not needed. Indeed, it is contemplated by us that the present invention can be employed in such outboard implementations. In present arrangements, delays that may be encountered by the network interface card in gaining access to the medium do not pose a problem because once access to the medium is acquired the network interface card can communicate with the application in such a way as to obtain from the application a sufficient amount of data beyond that which would normally be included within a packet so as to compensate for the delay as though, from a throughput standpoint, the delay never occurred. An outboard implementation would in all likelihood not have the benefit of such communication back to the application so that, if nothing more were done, then, even though all the accumulated data could ultimately get transmitted, unduly large delays could occur. We believe that an advantageous solution to this problem is that the outboard device—having been delayed and having transmitted such data as was provided by the application in its standard format—will try to "buy back" some of the delay by setting its timer to a smaller value than $t_{access}$ for a sufficient number of access periods to accommodate the delay that was incurred. In determining an appropriate timer setting, the device would need to be sure that the newly scheduled access time differs from those of any of the other then-active real-time stations by at least $t_{inter}$ in order to preclude collisions among the real-time stations.

The foregoing is merely illustrative and many variations are possible, as will now be shown by way of some examples: Although a single time interval $t_{min}$ is used in the disclosed embodiment both to determine a) when chains are close enough to each other to be joined, and b) so close that they should be separated, other embodiments may use different intervals for those two activities. It may be desired to include only one of the two above-described activities of a) of joining chains together under prescribed conditions, and b) increasing their separation or forcing them to be further apart. One or both of those activities could be carried out without taking into account the lengths of the chains or any prescribed maximum chain length. Various alternative embodiments may carry out such activities whenever the prescribed criteria are met, as is the case in the present illustrative embodiment or, alternatively, carry them out only on certain occasions when the criteria are met, this being done, for example, to avoid some of the processing and signaling overhead associated with these activities. We believe, in particular, that the frequency with which linked-list chains are allowed to join should not be allowed to become unduly large since each of these events introduces some inefficiency. (We do not, at the moment, have any quantitative measure of this.) In this same vein, the criterion used in particular embodiments to determine when chains are to be joined may be stated as being that they are joined only if the separation between them becomes less than some particular amount (such as $t_{min}$). This is a sufficient, but not necessary condition, meaning that they will not be joined unless their separation is less than $t_{min}$, but also meaning that they will not necessarily be joined just because that condition is met, thereby, for example, cutting down on overhead/inefficiency as just noted.

In the disclosed illustrative embodiment, a real-time station, upon detecting a collision is assumed to, in a sense, begin new frame transmission comprising the entirety of preamble 21, followed by one or more of the black slots 24 as previously described. A slightly more efficient approach is possible, however, in which, not all of preamble 21 is transmitted but only so much of it as is needed to make the total time of transmission since the station gained access equal to the length of preamble 21 as shown.

The foregoing merely illustrates the invention. Those skilled in the art will be able to devise numerous arrangements which, although not explicitly shown or described herein, embodying the principles of the invention and are thus within their spirit and scope.

The invention claimed is:

1. A contention-based communications network in which first and second independent linked-list chains of data packets, at least a given one of the first and second independent linked-list chains comprising data packets transmitted by a plurality of communications stations, once formed, are allowed to continue to exist independently for an indeterminate amount of time;
    wherein said first and second independent linked-list chains of data packets are joined into a single linked-list chain only if the separation between said first and second independent linked-list chains becomes less than a particular amount.

2. The invention of claim 1 wherein said communications network includes a communications medium and wherein the communications stations transmitting the data packets of said first and second independent linked-list chains repetitively access said medium.

3. A method comprising the step of forming multiple linked-list chains of data packets, at least a given one of the multiple linked-list chains comprising data packets transmitted by a plurality of communications stations in a contention-based communications network, said method characterized in that said multiple linked-list chains, after having been formed, are not always thereafter joined into a single linked-list chain;
    wherein first and second ones of said multiple linked-list chains of data packets are joined into a single linked-list chain only if the separation between said first and second ones of said multiple linked-list chains becomes less than a particular amount.

4. The invention of claim 3 wherein said multiple linked-list chains are independent linked-list chains which are allowed to continue to exist independently for an indeterminate amount of time.

5. The invention of claim 3 wherein said communications network includes a communications medium and wherein the communications stations transmitting the data packets repetitively access said medium.

6. A contention-based communications network in which first and second independent linked-list chains of data packets, at least a given one of the first and second independent linked-list chains comprising data packets transmitted by a plurality of communications stations, once formed, are allowed to continue to exist independently for an indeterminate amount of time;
    wherein if the separation between said first and second independent linked-list chains becomes less than a particular amount, the separation between said first and second independent linked-list chains is caused to be increased.

7. The invention of claim 6 wherein said communications network includes a communications medium and wherein the communications stations transmitting the data packets of said first and second independent linked-list chains repetitively access said medium.

8. A method comprising the step of forming multiple linked-list chains of data packets, at least a given one of the multiple linked-list chains comprising data packets transmitted by a plurality of communications stations in a contention-based communications network, said method characterized in that said multiple linked-list chains, after having been formed, are not always thereafter joined into a single linked-list chain;
  wherein if the separation between first and second ones of said multiple linked-list chains becomes less than a particular amount, the separation between said first and second ones of said multiple linked-list chains is caused to be increased.

9. The invention of claim 8 wherein said multiple linked-list chains are independent linked-list chains which are allowed to continue to exist independently for an indeterminate amount of time.

10. The invention of claim 8 wherein said communications network includes a communications medium and wherein the communications stations transmitting the data packets repetitively access said medium.

* * * * *